United States Patent [19]

Eberl et al.

[11] Patent Number: 4,464,516

[45] Date of Patent: Aug. 7, 1984

[54] PROCESS FOR PREPARING VINYL CHLORIDE POLYMERS

[75] Inventors: Karl Eberl, Burgkirchen; Manfred Engelmann, Burghausen; Edgar Fischer, Frankfurt am Main, all of Fed. Rep. of Germany

[73] Assignee: Hoechst Aktiengesellschaft, Fed. Rep. of Germany

[21] Appl. No.: 445,966

[22] Filed: Dec. 1, 1982

[30] Foreign Application Priority Data

Dec. 12, 1981 [DE] Fed. Rep. of Germany ....... 3149320

[51] Int. Cl.³ .............................................. C08F 2/00
[52] U.S. Cl. ....................................... 526/62; 427/387
[58] Field of Search ........................... 526/62; 427/387

[56] References Cited

U.S. PATENT DOCUMENTS 4,090,015  5/1978  Koyanagi et al. ................... 526/62

Primary Examiner—Melvyn I. Marquis
Attorney, Agent, or Firm—Connolly and Hutz

[57] ABSTRACT

A process is described for preparing vinyl chloride polymers. The polymerization is carried out in an apparatus the inside walls and internal fitments of which have been coated with a reaction product which forms on reacting certain silanes with inhibitors for free-radical polymerizations and which contain in the molecule at least one aromatic or at least one quinonoid ring and at least one hydrogen atom which is bonded to an oxygen, sulfur or nitrogen atom with subsequent reaction with water, drying and heat treatment.

The wall-deposit formation observed with the new process is markedly smaller, in particular after several polymerization batches, than in the case of known processes.

11 Claims, No Drawings

PROCESS FOR PREPARING VINYL CHLORIDE POLYMERS

The invention relates to a process as claimed in patent claim 1.

When vinyl chloride polymers are prepared by polymerization in an aqueous suspension, polymer deposits form in the course of the polymerization on the inside of the apparatus where the polymerization takes place and on internal fitments of the apparatus, such as the stirrer, baffles and the like. These deposits lower the yield of polymer and the quality of the product produced, since a proportion of these deposits drops off and ends up in the final product, where the relatively coarse particles can cause blockages in discharge lines, while the relatively fine particles are carried along in the working-up to give the dry polymer and on further processing then lead to specks or "fisheyes" in this polymer. The wall deposits in the apparatus also prevent the dissipation by these walls of the heat of polymerization, whereby uneconomically long reaction times have to be accepted.

The removal of such deposits is imperative and is usually carried out by mechanical means. Pressurized water spraying equipment is usually used for this purpose, but it only removes lightly adhering wall deposits. For this reason it is necessary to climb into the polymerization apparatus after every few batches and with extensive safety precautions to carry out additional mechanical cleaning by hand. These cleaning operations are expensive and the cause of prolonged down-times and hence considerably reduce the profitability of the process.

There has therefore been no shortage of attempts to reduce, or ideally to avoid completely, such polymer deposits in the preparation of vinyl chloride polymers in an aqueous dispersion.

Thus, it is known for example to strip the walls of the polymerization apparatus by means of an appropriately shaped stirrer or to regulate the wall temperature to certain values. Recently a large number of processes have been disclosed, where wall deposits are intended to be reduced, or avoided, partly by additives to the polymerization mixture and partly by a special coating of the surfaces in the polymerization apparatus. The mere fact that a large number of processes have been developed in a relatively short time shows that it is evidently difficult to find an optimal solution. Generally speaking, all processes which used additives to the polymerization mixture have the disadvantage that these additives can affect the course of the polymerization and also remain in more or less large quantities in the polymer, whereby the physiological acceptability of the polymer and also the processing behavior can be adversely affected. In general, wall coatings have these disadvantages to a lesser extent or not at all.

East German Pat. No. 118,287 discloses a process for treating the inside walls of polymerization reactors and equipment downstream of the polymerization which are used for the polymerization of vinyl chloride, in which the inside walls are coated with a modified silicone resin system. The coating comprises (a) 25 to 100 parts by weight of a branched methylpolysiloxane or methylphenylpolysiloxane which has a mean molecular weight of 300 to 5,000, an Si-bonded hydroxyl group content of 0.05 to 2% by weight and a methoxy group content of 0.1 to 10% by weight and which, if appropriate, is admixed with 0 to 75 parts by weight of a resin, such as an alkyd, epoxide or other resin, dissolved in an amount of 50 to 500 parts by weight of an organic solvent and/or a condensed-on halogenosiloxane and/or alkoxysilane or mixture of alkoxysilanes, dissolved in an amount of 100 to 5,000 parts by weight of an organic solvent, (b) 0 to 35 parts by weight of a methylsilicone or methylphenylsilicone oil having a viscosity of 2,000 to 7,000 cSt and an Si-bonded hydroxyl group content of 0.5 to 10% by weight and, if appropriate, (c) 0.01 to 5 parts by weight of a crosslinking-catalyzing combination of silicate/amine, such as, for example, ethyl orthosilicate together with diethanolamine or triethanolamine in an equivalent ratio, or of silicate/organic tin compound, such as, for example, ethyl orthosilicate together with dibutyltin acetate in an equivalent ratio. Inhibitors based on anthraquinone dyestuffs can be added to these coating materials.

As is demonstrated by a comparison of Examples 24 and 25 of the specification mentioned with Examples 11, 12, 14 and 15 of the same specification, adding an anthraquinone inhibitor compound does not achieve a significant improvement. In contrast, the process according to the invention produces a marked improvement, unexpected in view of the results shown in East German Pat. No. 118,287.

Two further processes are known, from German Offenlegungsschrift No. 2,919,197 and German Offenlegungsschrift No. 2,919,258, where vinyl chloride is polymerized in an apparatus the inside walls of which contain a coating wholly or partially comprised from a group of derivatives of phenthiazine or of phenoxazine. And indeed, only slight wall deposits are initially achieved by means of these processes. However, on prolonged used, in particular when several polymerization batches are carried out one after the other in the same apparatus, the deposit-preventing effect soon diminishes, so that the process according to the invention is now markedly superior, as demonstrated by the comparative experiments below.

The object of the present invention is to provide a process which has the disadvantages of known processes for preventing wall deposits in the polymerization of vinyl chloride either not at all or only to a relatively small extent.

In this new process for preparing vinyl chloride homo-, co- or graft-polymers which contain at least 50% by weight, relative to the polymer, of polymerized vinyl chloride units, by polymerization of vinyl chloride, if appropriate mixed with monomers which are copolymerizable with vinyl chloride and/or polymers which are graft-polymerizable with vinyl chloride, in an aqueous dispersion in the presence of free radical-forming catalysts, if appropriate suspension stabilizers, emulsifiers and polymerization auxiliaries, in an apparatus those surfaces of which which can come into contact with the polymerization mixture or only with the monomers have been provided with a coating, this coating is wholly or partially comprised of a reaction product which is obtained at $-20°$ to $200°$ C., in the presence or absence of an aprotic solvent, by reacting (a) at least one compound of the general formula $$R_n^I-Si-Z_{(4-n)} \qquad (I)$$

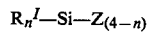

in which $R^I$ denotes a hydrocarbon radical having 1 to 6 carbon atoms and optionally carrying one or more of the following substituents:

F, Cl, Br, —SH, $NH_2$ and/or, if more than 1 or 2 carbon atoms are present, hetero atoms can be incorporated in its hydrocarbon chain as follows:

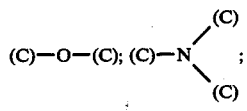

with the proviso that the radical $R^I$ does not contain —SH or —$NH_2$ groups when Z=Cl and/or is Br, Z denotes Cl, Br, —O—$R_1$, in which $R_1$ denotes an alkyl radical having 1 to 4 carbon atoms or —O—$COR_2$ in which $R_2$ has the meaning of $R_1$, and n denotes 0 or 1 and Z can be identical or different, with (b) at least one inhibitor for free-radical polymerizations which contains in the molecule at least one aromatic ring or at least one quinonoid ring and at least one hydrogen atom which is bonded to an oxygen, sulfur or nitrogen atom, then separating off excess compound (a) and, if present, the solvent, thereafter reacting the reaction product of the compounds mentioned, namely (a) and (b), with water at 10° to 100° C., if appropriate under an elevated pressure in the presence or absence of a solvent which is at least partially miscible with water and/or of a catalyst which is known for the hydrolysis of silicon compounds and then treating the hydrolysis product at 40° to 200° C., in the presence or absence of a catalyst which is known for the crosslinking of hydrolyzed silicon compounds.

The invention also relates to means for coating the internal parts of apparatus for the polymerization to suppress the formation of wall deposits, which contain at least one reaction product which has been prepared in the manner described above, by reacting at least one compound (a) with at least one inhibitor (b).

The invention also relates to a polymerization apparatus the inside walls and internal fitments of which have been provided with a coating which is wholly or partially comprised of a reaction product which has been prepared, in the manner described above, by reacting at least one compound (a) with at least one inhibitor (b).

Some typical representatives of compounds (a) are silicon tetrachloride, silicon tetrabromide, methyltrichlorosilane, methyltribromosilane, ethyltrichlorosilane, ethyltribromosilane, phenyltrichlorosilane, vinyltrichlorosilane, tetramethoxysilane, tetraethoxysilane, methyltrimethoxysilane, methyltriethoxysilane, ethyltrimethoxysilane, ethyltriethoxysilane, phenyltrimethoxysilane, phenyltriethoxysilane, vinyltrimethoxysilane, 3-aminoprop-1-yltrimethoxysilane, 3-chloroprop-1-yltrichlorosilane, 3-chloroprop-1-yltrimethoxysilane, 3-mercaptoprop-1-yltrimethoxysilane, methyltriacetoxysilane, ethyltriacetoxysilane and vinyltriacetoxysilane.

Particularly effective coatings are obtained if the reaction is carried out with at least one compound (a) having the formula (I) in which $R_n{}^I$=a hydrocarbon radical having 1 to 6 carbon atoms, Z=Cl or Br and n=0 or 1.

Reactant (b) is at least one inhibitor for free-radical polymerization which contains in the molecule at least one aromatic ring or at least one quinonoid ring and at least one hydrogen atom which is bonded to an oxygen, sulfur or nitrogen atom. Several aromatic rings and also several quinonoid rings can be present in the molecule, which can also contain, at the same time, one or more aromatic rings and one or more quinonoid rings. Both aromatic and also quinonoid rings can be present in the molecule not only in a self-contained state but also fused (as, for example, in naphthalene or naphthoquinone).

Compound (b) can contain several hydrogen atoms which are bonded to an oxygen, sulfur or nitrogen atom. The particular oxygen, sulfur or nitrogen atom can in turn be a substituent on an aromatic or quinonoid ring or be bonded to an aliphatic carbon atom.

Inhibitor (b) is advantageously at least one compound of the following general formula:

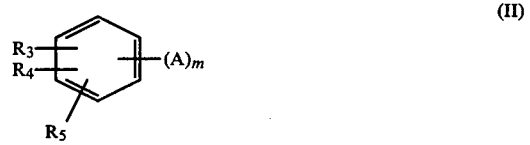

in which either $R_3$, $R_4$ and $R_5$ denote H, or —O—$R_6$ in which $R_6$ is an alkyl radical having 1 to 4 carbon atoms, or an alkyl radical having 1 to 4 carbon atoms, or a benzyl radical which optionally carries one or more —OH, $R_6$, or —O—$R_6$ substituents, it being possible for the radicals $R_3$, $R_4$ and $R_5$ to be identical or different from one another; or $R_3$ has the abovementioned meaning and $R_4$ and $R_5$ denote

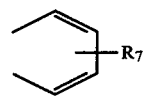

in which $R_7$=H, —OH, —$R_6$ or —$OR_6$ in which $R_6$ is an alkyl radical having 1 to 4 carbon atoms, A denotes —OH or —$NHR_8$ in which $R_8$=H or —$COCH_3$ or is an alkyl radical having 1 to 4 carbon atoms or a phenyl radical and in which m denotes the number 2 or 3.

Some typical representatives of compounds mentioned above and preferably used as inhibitor (b) are hydroquinone, chlorohydroquinone, 2,5-dichlorohydroquinone, tetrachlorohydroquinone, hydroxyhydroquinone, 2,5-dimethylhydroquinone, 2,5-dihydroxy-1-methyl-4-isopropylbenzene, pyrocatechol, 4-chloropyrocatechol, 4-methylpyrocatechol, 3,4-dihydroxy-1-propenylbenzene, 4-tert.-butylpyrocatechol, 4'-hydroxybenzyl-4-phenol, 4'-hydroxybenzyl-α-dimethyl-4-phenol, pyrogallol, 1,2-dihydroxynaphthalene, 1,4-dihydroxynaphthalene, 1,2-diaminobenzene, 1,4-diaminobenzene, 1,4-diaminobenzene-N-monoacetate, 1,4-diaminobenzene-N,N'-diacetate, 2,3-diaminotoluene, 2,5-diaminotoluene, 3,4-diaminotoluene, 4-chloro-1,2-diaminobenzene, N-methyl-1,4-diaminobenzene, N-ethyl-1,4-diaminobenzene and N-phenyl-1,4-diaminobenzene.

Inhibitor (b) is particularly preferably one or more compounds of the following general formula:

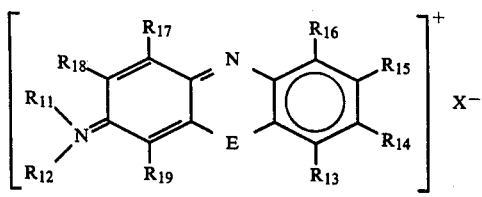 (III)

in which the individual substituents have the following meaning:

E = O or S, $R_{11}$ and $R_{12}$ = H, or a saturated hydrocarbon radical having 1 to 8 carbon atoms, $R_{13}$, $R_{14}$, $R_{15}$ and $R_{16}$ = H, a saturated hydrocarbon radical having 1 to 8 carbon atoms, OH, an O-saturated hydrocarbon radical having 1 to 8 carbon atoms,

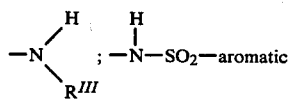

having 6 to 10 carbon atoms and optionally substituted by radicals such as $R_{11}/R_{12}$, or $R_{15}$ and $R_{16}$ = an aromatic having 6 to 10 carbon atoms and optionally substituted by radicals such as $R_{11}/R_{12}$, but at least one of the radicals $R_{13}$ to $R_{16}$ represents OH or

$R^{III} = R_{11}/R_{12}$ or an aromatic having 6 to 10 carbon atoms and optionally substituted by one or more of the groups below, which correspond to $R_{11}/R_{12}$, or an O-saturated hydrocarbon radical having 1 to 8 carbon atoms or one of the following radicals: —OH, —COOH

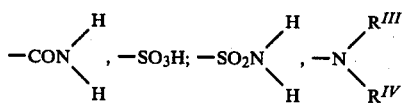

($R^{III}$ and $R^{IV}$ = H or $C_1$-$C_6$-alkyl)

$R_{17}$, $R_{18}$ and $R_{19}$ = H, a saturated hydrocarbon radical having 1 to 8 carbon atoms, preferably an aliphatic hydrocarbon radical having 1 to 6 carbon atoms, or an O-saturated hydrocarbon radical having 1 to 8 carbon atoms, preferably an O-aliphatic hydrocarbon radical having 1 to 6 carbon atoms, and X = any monovalent anion or a corresponding anion equivalent.

Some typical representatives of the class of compound described in the preceding section are described in Table I of German Offenlegungsschrift No. 2,919,197, on pages 11 to 16, and also Table I of German Offenlegungsschrift No. 2,919,258, on pages 11 to 15. The present description also relates to the Tables mentioned.

Compound (a) of the general formula (I) is reacted with the inhibitor (b) at temperatures of −20° to +200° C. This reaction is preferably carried out in the presence of an aprotic solvent. However, the reaction can also be carried out without an aprotic solvent. At temperatures below −20° C., the rate of reaction is often observed to be too low, also if an aprotic solvent is used the solubility of the reactants becomes too low and the technical effort for maintaining such low temperatures becomes too high. Above +200° C., thermal decomposition of the reaction product and other undesirable side-reactions are observed, in particular if alkoxysilanes are used as compound (a). The reaction is preferably carried out at temperatures of 10° to 100° C., in particular at 20° to 60° C.

It is generally not necessary to use pressures which are above or below normal atmospheric pressure. An aprotic solvent is preferably chosen the boiling point of which under atmospheric pressure is equal to or higher than the reaction temperature to be used.

The reaction of compound (a) with inhibitor (b) is preferably carried out in the presence of 2 to 200 parts by weight, and in particular in the presence of 50 to 150 parts by weight, relative to 1 part by weight of inhibitor (b), of one or more aprotic solvents which boil at 40° to 200° C. Examples of suitable aprotic solvents are acetone, benzene, toluene, diethyl ether, dibutyl ether, methyl ethyl ketone, xylene and dimethyl sulfoxide. Acetone and/or toluene are preferably used.

When the reaction has ended, the aprotic solvent(s) is(are) preferably removed from the reaction mixture, if appropriate together with unconverted compound (a). This removal can be carried out for example by distilling off, preferably under reduced pressure, at temperatures of 20° to about 100° C., with or without inert gases, such as, for example, nitrogen, being passed through. Provided the aprotic medium is adequately miscible with water (see below), for example acetone, it is also possible to dispense with separating off this solvent, but this measure is usually not advisable, since, frequently, less favorable effectiveness of the reaction products is observed, in particular in the case where a relatively large excess of compound (a), relative to inhibitor (b), was used.

0.1 to 5 moles of compound (a) are used in the reaction per gram atom of active hydrogen in inhibitor (b). "Active hydrogen in inhibitor (b)" is understood as meaning those hydrogen atoms which are bonded to oxygen, sulfur or nitrogen atoms. If less than 0.5 mole of compound (a) is used per gram of active hydrogen atom in inhibitor (b), the effectiveness of the reaction products markedly decreases, in particular in the case of prolonged polymerization times. If more than 5 moles of compound (a) are used per gram of active hydrogen atom in inhibitor (b), again a marked reduction in the effectiveness of the reaction products is to be observed. 0.25 to 2 moles of compound (a) are preferably used per gram of active hydrogen atom of inhibitor (b).

The reaction of compound (a) with inhibitor (b) is advantageously carried out in a dry inert gas atmosphere, for example in dry nitrogen. The reaction time necessary depends on the reaction temperature selected and on the reactivity of the reactants used. Reaction times of 0.1 to 5 hours are generally adequate. Below 0.1 hour, the reaction which takes place is usually only incomplete, while above 5 hours the reaction has as a rule ended, so that further extension of the reaction time represents an unnecessary consumption of energy and time without additional effect. The reaction time is preferably 1 to 3 hours.

When the reaction has ended and excess compound (a), and, if appropriate, aprotic solvent, has been separated off, the reaction product of compounds (a) and (b) is reacted with water at 10° to 100° C., if appropriate under an elevated pressure in the presence or absence of a solvent which is at least partially miscible with water and/or of a catalyst known for the hydrolysis of silicon compounds. To carry out this reaction, 1 to 1,000, preferably 10 to 500, parts by weight of water are added to each 1 part by weight of the reaction product of compounds (a) and (b). Advantageously, 10 to 1,000 parts by weight, and in particular 20 to 200 parts by weight, of a solvent which is at least partially miscible with water are added per 1 part by weight of the reaction product of compounds (a) and (b). The solvent used should boil at 30° to 120° C., and be miscible at the reaction temperature selected with at least 10% by weight of water, relative to the solvent/water mixture. A solvent is advantageously chosen the boiling point of which is greater than or equal to the temperature selected for the reaction with water. Examples of suitable solvents are methanol, ethanol, acetone and dioxane.

If the reaction of the reaction product of compounds (a) and (b) with water is carried out below 10° C., the reaction proceeds unnecessarily slowly, viscosity problems can arise, and it is observed that there is a reduction in the long-term action of the reaction product. Temperatures above 100° C. are generally not necessary, and require unnecessary additional expense, since pressure apparatus would have to be used. Also, the reaction with water becomes difficult to control, in particular when compound (a) contains silicon-chlorine or silicon-bromine bonds. Although, to obtain as complete as possible a reaction with water, the reaction with water can be carried out under an overpressure, for example of up to about 0.5 MPa and, correspondingly, also at temperatures of 100° C. to about 150° C., this is usually not necessary. The reaction is preferably carried out at 20° to 60° C.

The reaction of the reaction product of compounds (a) and (b) with water is advantageously carried out in the presence of 0.001 to 0.3% by weight, relative to the reaction mixture, of a catalyst known for the hydrolysis of silicon compounds. This addition is advisable particularly whenever compound (a) contains alkoxy groups. "Reaction mixture" is understood as meaning the mixture which contains the reaction product of compound (a) with inhibitor (b) together with water and, if appropriate, the water-miscible solvent described above. The catalysts used can be not only alkaline compounds the unimolar solution of which in water has a pH of at least 11, for example sodium hydroxide or potassium hydroxide, but also acids. At least one of the following materials is advantageously used: formic acid, acetic acid, propionic acid, hydrochloric acid, sulfuric acid or nitric acid.

If less than 0.001% by weight of the catalyst, relative to the reaction mixture, is used, the reaction is in general not adequately accelerated. If more than 0.3% by weight of catalyst, relative to the reaction mixture, is used, there is no noticeable additional effect. 0.01 to 0.2% by weight of catalyst, relative to the reaction mixture, is preferably used.

If compound (a) contains groups which on reaction with water produce acids, for example hydrochloric acid or acetic acid, the use of an additional hydrolysis catalyst is in general not necessary.

The time for reacting the reaction product of compounds (a) and (b) with water depends on the reaction temperature selected; it is 10 to about 200 minutes, preferably 30 to 120 minutes.

After the reaction with water, excess water and, if present, the solvent are removed, for example by evaporation, and the hydrolysis product is subjected to a heat treatment at 40° to 200° C. in the presence or absence of a catalyst known for crosslinking hydrolyzed silicon compounds. Below 40° C., reduced adhesion of the coating to apparatus parts is observed, while above 200° C. undesirable side-reactions and thermal decomposition of the hydrolysis product occur. The heat treatment is preferably carried out at 90° to 180° C., in particular at 100° to 140° C.

The time for the heat treatment again depends on the temperature used and is 0.25 to 5 hours. Below 0.25 hour, even if relatively high temperatures are used, decreasing adhesion of the coating to apparatus parts is observed; above 5 hours of heat treatment there is no additional effect at low treatment temperatures and to continue the treatment would unnecessarily consume energy and time. At higher treatment temperatures, there are in addition undesirable side-reactions. The heat treatment is preferably carried out for 0.5 to 3 hours, in particular for 1 to 2 hours. It can be carried out in normal atmospheric air.

The following compounds are suitable examples of catalysts known for crosslinking hydrolyzed silicon compounds: lead compounds, such as lead octoate, triethanolamine, tetramethylammonium hydroxide, triethylamine and ammonium chloride. 0.003 to 0.3% by weight, relative to the hydrolyzed reaction product of compounds (a) and (b), is used of these catalysts. Below 0.003% by weight no adequate catatlytic action occurs; above 0.3% by weight, no additional effect is observed. 0.05 to 0.1% by weight of one or more catalysts known for crosslinking hydrolyzed silicon compounds is preferably used. Not every case requires the use of such catalysts. They are preferably used when the hydrolyzed reaction product was formed from a compound (a) which contained alkoxy groups.

The removal of excess water and, if present, solvent after the hydrolysis and condensation of the reaction product of compounds (a) and (b) and the subsequent heat treatment of the hydrolysis product advantageously take place after the hydrolyzed mixture has been applied to those surfaces of the polymerization apparatus which come into contact with the polymerization mixture or solely with the monomers.

The hydrolyzed mixture can be applied using customary methods, for example by brushing, dipping or spraying. Solutions are used for the application which contain 0.01 to 1% by weight, preferably 0.1 to 0.6% by weight, relative to the solution of the hydrolyzed reaction product of compounds (a) and (b). Below 0.01% by weight, unnecessarily large amounts of solvents have to be used, while above 1% by weight the solubility of the hydrolyzed reaction product is frequently inadequate. After the hydrolysis has been carried out, it may be necessary to add a further amount of solvents, which are advantageously the same as were used in the hydrolysis.

Although it is possible to isolate the hydrolyzed reaction product of compounds (a) and (b) and use it for later coats, this is frequently less advisable, in particular when the hydrolysis product forms a viscous mass which dissolves in solvents only after a prolonged period. The surfaces to be provided with the coating are preferably comprised of those metals which are customarily used for polymerization apparatus, for example normal carbon steel or alloyed chromium/nickel steels, such as V2A or V4A steel, or of those other metals which are usually customary for plating, such as nickel, chromium or titanium.

The surfaces to be coated should be clean and grease-free. If necessary, they are pretreated with customary degreasing agents, for example acetone/methylene chloride mixtures.

The roughness of the surfaces to be coated is not critical within the usual limits. In general, micro-inch finishes of 2 to 20 µm produce good results.

The thickness of the coating on apparatus surfaces is 0.01 to 3 g of active substance per m$^2$ of coated area; below 0.01 g per m$^2$ it is generally impossible to obtain an even coating, and an uneven action is observed over the area. Above 3 g per m$^2$, an improving effect is not observed, and an unnecessarily high amount of material would be necessary. The coating preferably has a thickness of 0.1 to 1 g per m$^2$ of coated area.

The final coating can in principle be produced using several coatings applied on top of one another, but as a rule one coatings is sufficient. In particular when applying the coating by spraying or dipping it is advantageous, though not absolutely necessary, to heat the surfaces to be coated to 40° to 90° C. beforehand.

Polymer deposits can form not only on the inside walls of the polymerization apparatus but also on the so-called internal fitments, such as stirring devices, baffles (guide sheets), filling nozzles, valves, pumps, pipes, measuring instruments and internal coolers (heat exchangers), which must therefore also be provided, completely or partially, with a coating. The same applies to external coolers if attached more or less directly to the polymerization vessel.

The process according to the invention is suitable for free-radical polymerizations in an aqueous dispersion, in particular for preparing vinyl chloride homo-, co- or graft-polymers which contain at least 50% by weight, relative to the polymer, of polymerized vinyl chloride units. The polymerization can be carried out not only in an aqueous suspension but also in an aqueous emulsion, and the new process is preferably used for preparing polymers which contain 99 to 85% by weight, relative to the polymer, of polymerized vinyl chloride units. The process is also particularly suitable for the homo-polymerization of vinyl chloride. The polymerization can be carried out continuously or discontinuously (batchwise), with or without the use of a seed polymer.

The polymerization is carried out at temperatures of 35° to 85° C., preferably 45° to 75° C. The pressure in the polymerization vessel is advantageously the saturated vapor pressure of vinyl chloride, or of the mixture of monomers used, at the polymerization temperature used, but it can also be slightly above the saturated vapor pressure. This applies to the start of the polymerization. The pressure used is as a rule between 0.5 and about 1.5 MPa.

The ratio of aqueous phase to monomer-containing phase is advantageously about 1.0 to 2.0. Phase ratios above 2 are also possible, but they unnecessarily impair the profitability of the process.

The polymerization can also be carried out, if appropriate, using mixtures of vinyl chloride with monomers which are copolymerizable with vinyl chloride. Examples of monomers which, singly or mixed, are suitable for the mixture with vinyl chloride are olefins, such as ethylene or propylene, vinyl esters of straight-chain or branched carboxylic acids having 2 to 20, preferably 2 to 4, carbon atoms, such as vinyl acetate, vinyl propionate, vinyl butyrate, vinyl 2-ethylhexoate or vinyl isotridecanoate, vinyl halides, such as vinyl fluoride, vinylidene fluoride or vinylidene chloride, vinyl ether, vinylpyridine, unsaturated acids, such as maleic, fumaric, acrylic or methacrylic acid and their monoesters or diesters with monoalcohols or dialcohols having 1 to 10 carbon atoms, maleic anhydride, maleimide and its N-substitution products with aromatic, cycloaliphatic and optionally branched aliphatic substitutions, acrylonitrile, and styrene.

Vinyl chloride or the mixture of monomers predominantly containing vinyl chloride and described in more detail above can be polymerized with the addition of polymers which are graft-polymerizable with vinyl chloride. Examples which are suitable for this purpose are elastomeric polymers which have been obtained by polymerization of one or more of the following monomers: dienes, such as butadiene or cyclopentadiene, olefins, such as ethylene or propylene, styrene, unsaturated acids, such as acrylic or methacrylic acid and their esters with monoalcohols or dialcohols having 1 to 10 carbon atoms, acrylonitrile, vinyl compounds, such as vinyl esters of straight-chain or branched carboxylic acids having 2 to 20, preferably 2 to 4, carbon atoms, and vinyl halides, such as vinylidene chloride or vinyl chloride, but the latter only together with at least one of the previously mentioned monomers.

One or more monomer-soluble or water-soluble free radical-forming catalysts are used in the polymerization. The total amount of catalysts to be used is 0.001 to 3% by weight, preferably 0.01 to 0.3% by weight, relative to monomer(s) used. Examples of suitable catalysts are diaryl or diacyl peroxides, such as diacetyl peroxide, acetylbenzoyl peroxide, dilauroyl peroxide, dibenzoyl peroxide, bis-2,4-dichlorobenzoyl peroxide and bis-2-methylbenzoyl peroxide, dialkyl peroxides, such as di-tert.-butyl peroxide, per-esters, such as tert.-butyl percarbonate, tert.-butyl peracetate, tert.-butyl peroctoate, tert.-butyl perpivalate or cumyl perneodecanoate, dialkyl peroxydicarbonates, such as di-isopropyl, diethylhexyl, dicyclohexyl, or diethylcyclohexyl peroxydicarbonate, diacetyl peroxydicarbonate or bis-(4-tert.-butyl)-cyclohexyl peroxydicarbonate, mixed anhydrides of organic sulfoperacids and organic acids, such as acetylcyclohexylsulfonyl peroxide, and also azo compounds known as polymerization catalysts, such as azoisobutyronitrile.

Examples of suitable water-soluble catalysts are peroxydisulfates, peroxydiphosphates, perborates of potassium, sodium or ammonium, hydrogen peroxide, tert.-butyl hydroperoxide or other water-soluble peroxides and also mixtures of various catalysts, and these catalysts can also be used in the presence of 0.001 to 1% by weight, relative to the monomers, of one or more reducing substances which are suitable for developing a redox catalyst system, such as, for example, sulfites, bisulfites, dithionites, thiosulfates or aldehyde-sulfoxylates, for example sodium formaldehyde-sulfoxylate. The polymerization may also be carried out in the presence of 0.05 to 10 ppm, relative to metal per monomer, of soluble metal salts, for example of copper, silver, iron, nickel, cobalt or chromium.

The polymerization, if performed using the suspension method, can also take place in the presence of 0.01 to 1% by weight, preferably 0.05 to 0.3% by weight, relative to the monomers, of one (or more) protective colloid(s), such as, for example, polyvinyl alcohol which, if appropriate, also contains up to 40 mole % of acetyl groups, cellulose derivatives, such as water-soluble methylcellulose, carboxymethylcellulose, hydroxyethylcellulose or methylhydroxypropylcellulose, and gelatin, glue, dextran, and also copolymers of maleic acid, or of its half-esters, and styrenes.

The polymerization can also be carried out in the presence of 0.01 to 5% by weight, relative to the monomers, of one or more emulsifiers, which can also be used mixed with the abovementioned protective colloids. The emulsifiers used can be of the anionic, amphoteric, cationic and nonionic type. Suitable examples of anionic emulsifiers are the alkali metal, alkaline earth metal or ammonium salts of fatty acids, such as of lauric acid, palmitic acid or stearic acid, of acidic fatty alcohol sulfuric acid esters, of paraffinsulfonic acids, of alkylarylsulfonic acids, such as dodecylbenzenesulfonic acid or dibutylnaphthalenesulfonic acid, of sulfosuccinic acid dialkyl esters, and the alkali metal and ammonium salts of epoxy-containing fatty acids, such as epoxystearic acid, and of reaction products of peracids, for example peracetic acid with saturated fatty acids such as oleic acid. Suitable examples of amphoteric or cationic emulsifiers are alkylbetaines, such as dodecylbetaine, and alkylpyridinium salts, such as laurylpyridinium hydrochloride, and also alkylammonium salts, such as oxethyldodecylammonium chloride. Suitable examples of non-ionic emulsifiers are partial fatty acid esters of polyhydric alcohols, such as glycerol monostearate, sorbitol monolaurate, sorbitol monooleate or sorbitol monopalmitate, polyoxyethylene ethers of fatty alcohols or aromatic hydroxy compounds, polyoxyethylene esters of fatty acids and polypropylene oxide/polyethylene oxide condensation products.

In addition to catalysts, if appropriate protective colloids and/or emulsifiers being present, the polymerization can also be carried out in the presence of buffer substances, such as, for example, alkali metal acetates, borax, alkali metal phosphates, alkali metal carbonates, ammonia or ammonia salts of carboxylic acids and molecular size regulators, such as, for example, aliphatic aldehydes having 2 to 4 carbon atoms, chlorinated or brominated hydrocarbons, such as, for example, dichloroethylene, trichloroethylene, chloroform, bromoform or methylene chloride, and mercaptans.

Further suitable polymerization auxiliaries have been described, for example in the book "Polyvinylchlorid und Vinylchlorid-Mischpolymerisate [Polyvinyl Chloride and Vinyl Chloride Copolymers]" by H. Kainer, published by Springer, Berlin/Heidelberg/New York, 1965, pages 15 to 59. The pH value of the polymerization mixture can be between 3 and 10.

As already mentioned at the outset, the process according to the invention makes it possible to carry out free-radical polymerizations in an aqueous dispersion, in particular for preparing vinyl chloride polymers, with significantly less wall deposit formation occurring than in the case of known processes in accordance with the state of the art. This results in a saving in clean-up times, problems due to contamination of the polymer produced with coarse fractions are avoided and the constancy of heat transfer from the polymerization mixture to the wall of the vessel is maintained even for prolonged polymerization times, enabling an increase in productivity to take place. The polymer produced is not contaminated with physiologically harmful substances.

The examples which follow are intended to illustrate the invention in more detail:

EXAMPLES 1, 3, 6 TO 10 AND 14 TO 26

Preparation of inventive reaction products of compounds (a) with inhibitors (b)

20 mmoles of a compound (a) as can be seen from the table below are dissolved in 200 ml of anhydrous acetone. A solution of 20 mmoles of an inhibitor (b) as can be seen from the table below in 200 ml of acetone is added dropwise stirring in a dry nitrogen atmosphere over 60 minutes, during which the temperature of the mixture is maintained at the value which can be seen from the table. After the evolution of gas has ended, stirring of the mixture is continued until the total reaction time which can be seen from the table has been reached, the acetone is then distilled off at 50° C. under slightly reduced pressure, and the mixture is then treated for 2 hours at 50° C. and under a pressure of 1 kPa to remove any unconverted compound (a) which may be present. A crystalline powder is obtained, of which 5 g are dissolved in 500 ml of acetone (this corresponds to 79 parts by weight of acetone per part by weight of the reaction product of compound a with inhibitor (b). 500 ml of water (this corresponds to 100 parts by weight of water per part by weight of the reaction product of a+b) are added to this solution, which is then stirred for the time and at the temperature which can be seen from the table and is then used as described below for coating.

EXAMPLES 2 AND 4

Example 1 is repeated, but 1 g of formic acid (this corresponds to 0.11% by weight, relative to the mixture of water+solvent+reaction product of a and b) is added to the 500 ml of water.

EXAMPLES 5 AND 27

Example 1 is repeated, except that 0.3 g of concentrated hydrochloric acid containing 30% by weight of HCl (this corresponds to 0.01% by weight of HCl, relative to the mixture of water+solvent+reaction product a and b) is added to the 500 ml of water.

EXAMPLES 11 TO 13

Example 1 is repeated, except that 5 g of the reaction product of a and b are dissolved in 2,500 ml of acetone (this corresponds to 395 parts by weight per 1 part by weight of the reaction product of a and b) and 2,500 ml (this corresponds to 500 parts by weight per 1 part by weight of the reaction product of a and b) are added to the solution.

COMPARATIVE EXPERIMENTS A, E AND G

These experiments serve as blanks, no coating solution being used.

COMPARATIVE EXPERIMENTS B, C, I, K, L AND M 5 g of the compound a which can be seen from the table are dissolved in 500 ml of acetone, and 500 ml of water which in the case of Experiments C, I and K contains 1 g (this corresponds to 0.11% by weight, relative to the solution of a in water/acetone) of formic acid as a catalyst are added to the solution. The mixture is stirred for the time and at the temperature which can be seen from the table and then used for coating as described below.

COMPARATIVE EXPERIMENTS D, F, H AND N 1 g of the inhibitor (b) which can be seen from the table is added with stirring to 170 ml of water, sodium hydroxide solution is then added dropwise until the pH value of the resulting solution is 9.5, and the solution is made up to 200 ml with water. This solution is used for coating as described below.

COMPARATIVE EXPERIMENT O 136 g of methyltrimethoxysilane, 54 g of water and 0.2 g of formic acid are maintained with stirring at 60° C. for 5 hours under normal atmospheric pressure. The mixture is then treated for 2 hours at 50° C. and under 1 kPa of pressure to remove any methyltrimethoxysilane which may still be present. 1 g of the silicone resin thus obtained and 1 g of 1,2,4-trihydroxyanthraquinone are dissolved in 200 ml of acetone and 200 ml of water, and the solution thus obtained is used for coating as described below.

The degree of deposit formation is determined as follows:

One test employs 2 sheets of chromium/nickel ($V_4A$) steel, having a size of 200×36 mm, a thickness of 1 mm and an average micro-inch finish of 3 $\mu$m. The sheets are placed for ¼ hour each in succession in two vessels each of which is filled with a 1:1 mixture of acetone and methylene chloride. The sheets thus degreased are dried for 10 minutes in a drying cabinet at 60° C., and weighed. The sheets are then provided with a coating using the method of coating which can be seen from the table below and a coating solution which has been prepared as described above, dried again for 20 minutes at 60° C. and then subjected to the heat treatment which can be seen from the table; the sheets are then weighed again and the thickness of the coating is determined from the difference in weight.

The sheets thus pretreated, together with two degreased but uncoated sheets as blanks, are mounted in such a way at approximately half height on the inside wall of a 400 liter $V_4A$ steel reactor that the uncoated side of the sheet is tightly bonded with the wall of the reactor and the coated side of the sheet comes freely into contact with the contents of the reactor, quasi as a new part of the reactor wall.

The reactor is equipped with an impeller stirrer and a jacket. When the test sheets have been mounted, the reactor is filled with 215 liters of water which contains a solution of 50 g of a partially hydrolyzed polyvinyl acetate and 40 g of methylhydroxypropylcellulose. The reactor is then sealed, the air is displaced by gaseous vinyl chloride, and 115 kg of vinyl chloride and 115 g of diethylhexyl peroxydicarbonate (as a 65% by weight solution in aliphatics) are added under pressure. The reactor contents are heated up with stirring at 100 rpm until the temperature which can be seen from the table has been reached and is maintained at this temperature until the pressure in the reactor has dropped by 0.4 MPa. This is the case after about 6 hours. The reactor is then cooled down, let down, emptied, rinsed out with water and opened. If deposit formation is to be determined after only one polymerization batch, the test sheets are removed from the reactor, rinsed down with distilled water, dried for 60 minutes at 80° C., cooled down and weighed. The difference in weight compared to the test sheets before the polymerization is determined and expressed relative to the blank value (=100%) produced by the two uncoated test sheets.

To determine the permanence of the effect, 3 successive polymerizations, as described in more detail above, are carried out in some of the experiments in the same reactor provided with test sheets, and the test sheets are removed only then and deposite formation is determined as described above.

TABLE

| Experiment or Example No. | Compound[a] | Inhibitor[b] | mole of [a] per g atom of H of [b] | Reaction temperature °C. | Reaction time (minute) | Part by weight of aprotic solvent per part by weight of [b] | Hydrolysis temperature °C. | Hydrolysis time (minute) | Method of application | % by weight of a + b in application solution |
|---|---|---|---|---|---|---|---|---|---|---|
| A | — | — | — | — | — | — | — | — | — | — |
| B | CH₃SiCl₃ | — | — | — | — | — | — | — | spraying | 0.56 |
| C | Si(OC₂H₅)₄ | — | — | — | — | — | 20 | 30 | spraying | 0.56 |
| D | — | α | — | — | — | — | 50 | 120¹ | brushing | 0.5 |
| 1 | SiCl₄ | α | 0.5 | 20 | 120 | 55 | 20 | 30 | spraying | 0.56 |
| 2 | Si(OC₂H₅)₄ | α | 0.5 | 40 | 180 | 55 | 50 | 120¹ | spraying | 0.56 |
| E | — | — | — | — | — | — | — | — | — | — |
| F | — | α | — | — | — | — | — | — | brushing3× | 0.5 |
| 3 | SiCl₄ | α | 0.5 | 20 | 120 | 55 | 20 | 30 | spraying | 0.56 |
| G | — | — | — | — | — | — | — | — | — | — |
| H | — | α | — | — | — | — | — | — | spraying | 0.5 |
| I | Si(OCH₃)₄ | — | — | — | — | — | 50 | 120¹ | spraying | 0.56 |
| K | Si(OC₂H₅)₄ | α | — | — | — | — | 50 | 120¹ | spraying | 0.56 |
| L | CH₃SiCl₃ | α | — | — | — | — | 20 | 30 | spraying | 0.56 |
| M | SiCl₄ | — | — | — | — | — | 20 | 30 | spraying | 0.56 |
| 4 | Si(OC₂H₅)₄ | α | 0.5 | 40 | 180 | 55 | 50 | 120¹ | spraying | 0.56 |
| 5 | CH₃Si(OC₂H₅)₃ | α | 0.5 | 40 | 180 | 55 | 50 | 120² | spraying | 0.56 |
| 6 | CH₃Si(OCOCH₃)₃ | α | 0.5 | 20 | 120 | 55 | 20 | 60 | spraying | 0.56 |
| 7 | CH₂=CHSi(OCOCH₃)₃ | α | 0.5 | 20 | 120 | 55 | 20 | 60 | spraying | 0.56 |
| 8 | CH₃SiCl₃ | α | 0.5 | 20 | 120 | 55 | 20 | 30 | spraying | 0.56 |
| 9 | SiCl₄ | α | 0.5 | 20 | 120 | 55 | 20 | 30 | spraying | 0.56 |
| 10 | CH₂=CHSiCl₃ | α | 0.5 | 20 | 120 | 55 | 20 | 30 | spraying2× | 0.56 |
| 11 | SiCl₄ | β | 0.5 | 20 | 120 | 55 | 20 | 30 | spraying | 0.56 |
| 12 | SiCl₄ | γ | 0.5 | 20 | 120 | 55 | 20 | 30 | spraying | 0.11 |
| 13 | SiCl₄ | δ | 0.5 | 20 | 120 | 55 | 20 | 30 | dipping1× | 0.11 |
| 14 | SiCl₄ | ε | 0.25 | 20 | 120 | 55 | 20 | 30 | brushing3× | 0.11 |
| 15 | SiCl₄ | ζ | 0.5 | 20 | 120 | 55 | 20 | 30 | spraying | 0.56 |
| N | — | — | — | — | — | — | — | — | brushing3× | 0.5 |
| 16 | SiCl₄ | η | 0.5 | 20 | 120 | 55 | 20 | 30 | spraying | 0.56 |
| 17 | SiCl₄ | θ | 0.5 | 20 | 120 | 143 | 20 | 30 | spraying | 0.56 |
| 18 | SiCl₄ | ι | 0.5 | 20 | 120 | 69 | 20 | 30 | spraying | 0.56 |
| 19 | SiCl₄ | κ | 0.5 | 20 | 120 | 146 | 20 | 30 | spraying | 0.56 |
| 20 | SiCl₄ | λ | 0.5 | 20 | 120 | 27 | 20 | 30 | spraying | 0.56 |
| 21 | SiCl₄ | α | 0.5 | 20 | 120 | 25 | 20 | 30 | spraying | 0.56 |
| 22 | SiCl₄ | α | 0.5 | 20 | 120 | 20 | 20 | 30 | spraying | 0.56 |
| 23 | SiCl₄ | α | 0.5 | 20 | 120 | 25 | 20 | 30 | spraying | 0.56 |
| 24 | SiCl₄ | α | 0.5 | 20 | 120 | 22 | 20 | 30 | spraying | 0.56 |
| 25 | SiCl₄ | μ | 0.5 | 20 | 120 | 25 | 20 | 30 | spraying | 0.56 |
| 26 | CH₃Si(OC₂H₅)₃ | ζ | 0.5 | 40 | 180 | 55 | 50 | 120² | spraying | 0.56 |
| 27 | Silicone resin | ν | — | — | — | — | — | — | spraying | 0.56 |

| Experiment or Example No. | Compound[a] | Heat treatment Temperature °C. | Time (minute) | Application level g/m² | Type of polymerization | Polymerization temperature °C. | Number of batches | Amount of deposit (mg) | Relative deposit blank = 100% | Comments |
|---|---|---|---|---|---|---|---|---|---|---|
| A | — | — | — | — | — | — | — | 120 | 100 | a |
| B | CH₃SiCl₃ | 135 | 60 | 0.51 | S | 53 | 1 | 88 | 73 | — |
| C | Si(OC₂H₅)₄ | 135 | 60 | 0.50 | S | 53 | 1 | 116 | 97 | — |

TABLE-continued

| | Reagent | | | Application thickness g/m² | Type of application | | | Comments |
|---|---|---|---|---|---|---|---|---|
| D | SiCl₄ | 20 | — | 0.21 | s | 1 | 23 | 19 | b |
| 1 | SiCl₄ | 135 | 60 | 0.54 | s | 1 | <3 | <2 | — |
| 2 | Si(OC₂H₅)₄ | 135 | 60 | 0.51 | s | 1 | 15 | 12 | a |
| E | — | — | — | — | s | 1 | 220 | 100 | b |
| F | SiCl₄ | 20 | — | 0.22 | s | 1 | 33 | 15 | a |
| 3 | SiCl₄ | 135 | 60 | 0.57 | s | 1 | 10 | 4.5 | b |
| G | — | — | — | — | s | 3 | 556 | 100 | — |
| H | Si(OCH₃)₄ | 135 | 60 | 0.40 | s | 3 | 163 | 29 | — |
| I | Si(OC₂H₅)₄ | 135 | 60 | 0.52 | s | 3 | 597 | 107 | — |
| K | CH₃SiCl₃ | 135 | 60 | 0.51 | s | 3 | 588 | 105 | — |
| L | SiCl₄ | 135 | 60 | 0.53 | s | 3 | 575 | 103 | — |
| M | Si(OC₂H₅)₄ | 135 | 60 | 0.56 | s | 3 | 463 | 83 | — |
| 4 | Si(OC₂H₅)₄ | 135 | 60 | 0.51 | s | 3 | 119 | 21 | — |
| 5 | CH₃Si(OC₂H₅)₃ | 135 | 60 | 0.56 | s | 3 | 100 | 18 | — |
| 6 | CH₃Si(OCOCH₃)₃ | 135 | 60 | 0.52 | s | 3 | 127 | 23 | — |
| 7 | CH₂=CHSi(OCOCH₃)₃ | 135 | 60 | 0.53 | s | 3 | 131 | 24 | — |
| 8 | CH₃SiCl₃ | 135 | 60 | 0.53 | s | 3 | <10 | <1 | — |
| 9 | SiCl₄ | 135 | 60 | 1.01 | s | 3 | <10 | <1 | — |
| 10 | CH₂=CHSiCl₃ | 135 | 60 | 0.51 | s | 3 | 98 | 17 | — |
| 11 | SiCl₄ | 135 | 60 | 0.17 | s | 3 | 49 | 9 | — |
| 12 | SiCl₄ | 135 | 60 | 0.03 | s | 3 | 60 | 11 | — |
| 13 | SiCl₄ | 135 | 60 | 0.07 | s | 3 | 71 | 13 | — |
| 14 | SiCl₄ | 80 | 60 | 0.54 | s | 3 | 20 | 3 | — |
| 15 | SiCl₄ | 180 | 60 | 0.50 | s | 3 | <10 | <1 | — |
| N | — | 135 | 60 | 0.20 | s | 3 | 147 | 26 | c |
| 16 | SiCl₄ | 135 | 60 | 0.51 | s | 3 | 53 | 9 | — |
| 17 | SiCl₄ | 135 | 60 | 0.51 | s | 3 | 212 | 37 | — |
| 18 | SiCl₄ | 135 | 60 | 0.53 | s | 3 | 102 | 18 | — |
| 19 | SiCl₄ | 135 | 60 | 0.55 | s | 3 | 85 | 15 | — |
| 20 | SiCl₄ | 135 | 60 | 0.51 | s | 3 | 50 | 9 | — |
| 21 | SiCl₄ | 135 | 60 | 0.50 | s | 3 | 57 | 10 | — |
| 22 | SiCl₄ | 135 | 60 | 0.55 | s | 3 | 45 | 8 | — |
| 23 | SiCl₄ | 135 | 60 | 0.53 | s | 3 | 63 | 11 | — |
| 24 | SiCl₄ | 135 | 60 | 0.57 | s | 3 | 51 | 9 | — |
| 25 | SiCl₄ | 135 | 60 | 0.60 | s | 3 | 47 | 8 | — |
| 26 | SiCl₄ | 135 | 60 | 0.50 | s | 3 | 58 | 10 | — |
| 27 | CH₃Si(OC₂H₅)₃ | 135 | 60 | 0.56 | s | 3 | 107 | 19 | — |
| O | Silicone resin | 60 | 120 | 0.57 | s | 3 | 185 | 33 | d |

Footnotes to the table:
1 = 1 g of formic acid per 900 g of the solution of a + b in H₂O/acetone
2 = 0.3 g of concentrated hydrochloric acid (= 0.09 g of HCl) per 900 g of the solution of a + b in H₂O/acetone Comments
a = blank
b = in accordance with German Offenlegungsschrift 2,919,258
c = in accordance with German Offenlegungsschrift 2,919,197
d = analogously to East German Patent 118,287

(Inhibitor b)
(α) = 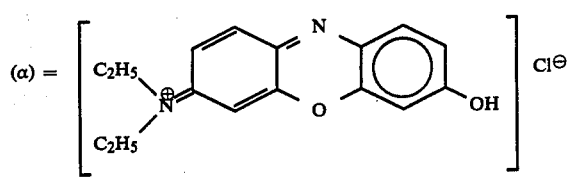
(β) = 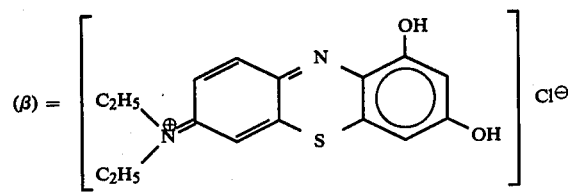
(γ) = 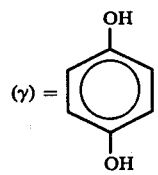
(δ) = 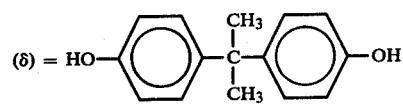
(ε) = 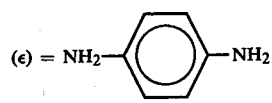
(ζ) = 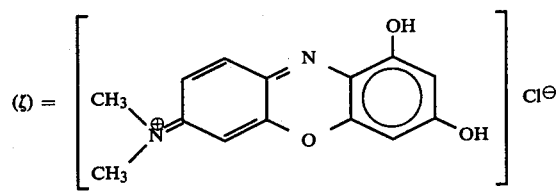
(η) = 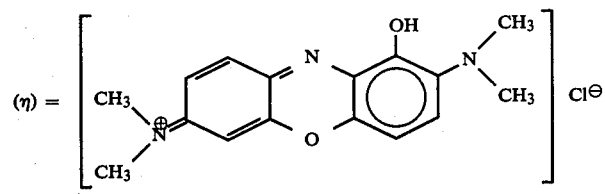
(θ) = 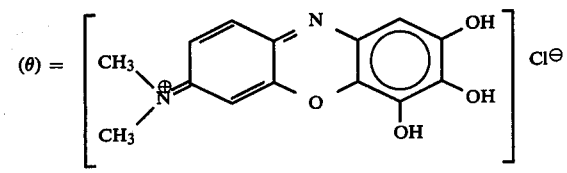
(ι) = 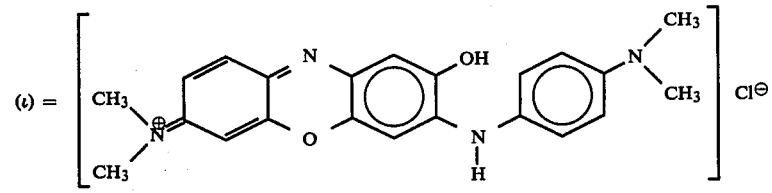

(Inhibitor b)

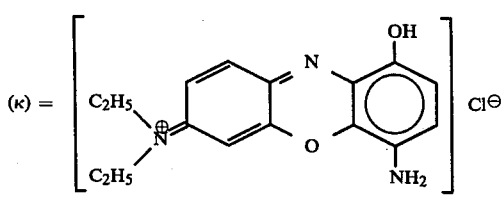

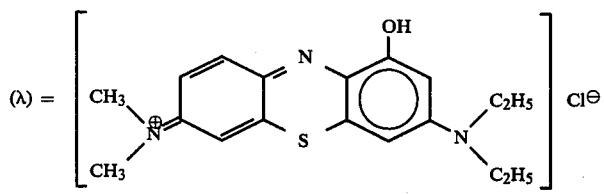

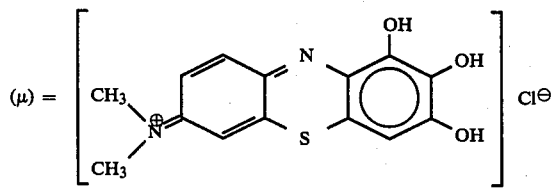

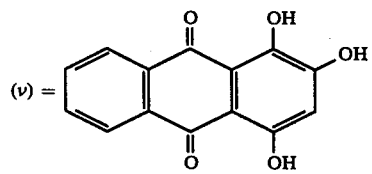

COMPARATIVE EXPERIMENT P (BLANK)

A V4A steel reactor which contains a paddle stirrer and a jacket is carefully cleaned on the inside from contaminants adhering to the surface, and then filled with 100 parts by weight of demineralized water which contains 1.4 parts by weight of a mixture of paraffinsulfonic acids of $C_{14}$–$C_{16}$ chain lengths, 0.05 part by weight of disodium hydrogenphosphate and 0.2 part by weight of potassium persulfate. The aqueous solution is adjusted to pH 9.5 by means of ammonia water, the air is displaced from the reactor by means of dry nitrogen, and 75 parts by weight of vinyl chloride are fed in under pressure and emulsified in the aqueous liquor by stirring. The mixture is then heated with stirring to 54° C. and maintained at this temperature until 90% by weight of the vinyl chloride used have been polymerized. The reactor is then cooled down, let down, emptied and rinsed with water. A polymer deposit which is removed, dried and weighed is formed on the wall. 1,170 g of deposit are determined.

COMPARATIVE EXPERIMENT Q

Comparative Experiment P is repeated, except that the cleaned and dry inside wall of the reactor is heated to 60° C. before the reactor is filled and coated by spraying with 2,000 ml of a water/acetone solution prepared as described under Comparative Experiment C, and then treated for 1 hour at 135° C. After the reactor has cooled down, it is filled as indicated, and a polymerization reaction is carried out. 923 g of deposit are determined after the polymerization has ended.

EXAMPLE 20

Comparative Experiment Q is repeated, except that the water/acetone solution described in Example 3 is used to coat the inside wall of the reactor instead of the water/acetone solution described in Comparative Experiment C. 85 g of deposit are determined after the polymerization has ended.

We claim:

1. A process for preparing vinyl chloride homo-, co- or graft-polymers which contain at least 50% by weight, relative to the polymer, of polymerized vinyl chloride units, by polymerization of vinyl chloride, in the absence or presence of monomers which are copolymerizable with vinyl chloride, polymers which are graft-polymerizable with vinyl chloride, or mixtures thereof, in an aqueous dispersion in the presence of free radical-forming catalysts, and in the presence or absence of suspension stabilizers, emulsifiers and polymerization auxiliaries, in an apparatus those surfaces of which which can come into contact with the polymerization mixture or only with the isomers have been provided with a coating, wherein this coating is wholly or partially comprised of a reaction product which is obtained at −20° to +200° C., in the presence or absence of an aprotic solvent, by reacting (a) at least one compound of the formula

in which

Z denotes Cl, Br, —O—$R_1$, in which $R_1$ denotes an alkyl radical having 1 to 4 carbon atoms or —O-

COR₂ in which R₂ denotes an alkyl radical having 1 to 4 carbon atoms, n denotes 0 or 1, and the Z radicals can be identical or different, and R$^I$ denotes a hydrocarbon radical having 1 to 6 carbon atoms and carrying none, one or more of the following substituents:

F, Cl, Br, —SH, NH₂ or, if more than 1 or 2 carbon atoms are present, heteroatoms can be incorporated in its hydrocarbon chain as follows:

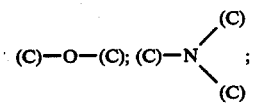

with the proviso that the radical R$^I$ does not contain —SH or —NH₂ groups when at least one Z is Cl or Br, with (b) at least one inhibitor for free-radical polymerizations which contains in the molecule at least one aromatic ring or at least one quinonoid ring and at least one hydrogen atom which is bonded to an oxygen, sulfur or nitrogen atom, then separating off excess compound (a) and, if present, the solvent, thereafter reacting the reaction product of the compounds mentioned, namely (a) and (b), with water at 10° to 100° C., under normal or elevated pressure in the presence or absence of a solvent which is at least partially miscible with water or of a catalyst, or of mixtures thereof, said catalyst being one which is known for the hydrolysis of silicon compounds and then treating the hydrolysis product at 40° to 200° C., in the presence or absence of a catalyst which is known for the cross-linking of hydrolyzed silicon compounds.

2. The process as claimed in claim 1, wherein 0.25 to 2 moles of compound (a) are reacted per g atom of hydrogen which is bonded to an oxygen, sulfur or nitrogen atom in inhibitor (b).

3. The process as claimed in claim 1 or 2, wherein the reaction of compound (a) with inhibitor (b) is carried out at 10° to 100° C.

4. The process as claimed in claim 1 or 2, wherein at least one compound (a) of the formula (I) in which:
R$^I$=a hydrocarbon radical having 1 to 6 carbon atoms,
Z=Cl or Br, and
n=0 or 1,
is used.

5. The process as claimed in claim 1 or 2, wherein inhibitor (b) is a compound of the following formula

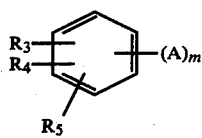

(II)

in which
either R₃, R₄ and R₅ denote H, or —O—R₆ in which R₆ is an alkyl radical having 1 to 4 carbon atoms, or an alkyl radical having 1 to 4 carbon atoms, or a substituted or unsubstituted benzyl radical which when substituted carries one or more —OH, R₆, or —O—R₆ substituents, it being possible for the radicals R₃, R₄ and R₅ to be identical or different from one another;

or R₃ has the abovementioned meaning and R₄ and R₅ denote

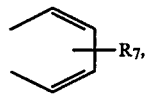

in which
R₇=H, —OH, —R₆ or —OR₆ in which R₆ is an alkyl radical having 1 to 4 carbon atoms,
A denotes —OH or —NHR₈ in which R₈=H or —COCH₃ or is an alkyl radical having 1 to 4 carbon atoms or a phenyl radical and in which
m denotes the number 2 or 3.

6. The process as claimed in claim 1 or 2, wherein inhibitor (b) is a compound of the following formula

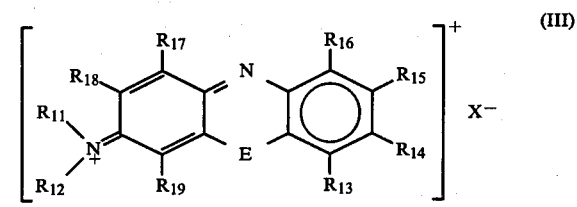

(III)

in which the individual substituents have the following meaning:
E=O or S,
R₁₁ and R₁₂=H, or a saturated hydrocarbon radical having 1 to 8 carbon atoms,
R₁₃, R₁₄, R₁₅ and R₁₆=H, a saturated hydrocarbon radical having 1 to 8 carbon atoms, OH, an O-saturated hydrocarbon radical having 1 to 8 carbon atoms,

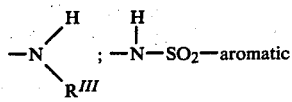

having 6 to 10 carbon atoms and unsubstituted or substituted by radicals such as R₁₁, or R₁₅ and R₁₆=an aromatic having 6 to 10 carbon atoms and unsubstituted or substituted by radicals such as R₁₁, but at least one of the radicals R₁₃ to R₁₆ represents OH or

R$^{III}$=R₁₁ or an aromatic having 6 to 10 carbon atoms and unsubstituted or substituted by one or more of the groups below, which correspond to R₁₁, or an O-saturated hydrocarbon radical having 1 to 8 carbon atoms or one of the following radicals: —OH, —COOH

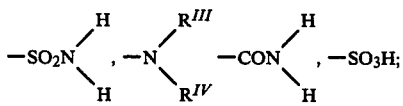

$R^{III}$ and $R^{IV}$=H or $C_1$-$C_6$-alkyl $R_{17}$, $R_{18}$ and $R_{19}$=H, a saturated hydrocarbon radical having 1 to 8 carbon atoms, preferably an aliphatic hydrocarbon radical having 1 to 6 carbon atoms, or an O-saturated hydrocarbon radical having 1 to 8 carbon atoms, preferably an O-aliphatic hydrocarbon radical having 1 to 6 carbon atoms, and X=any monovalent anion or a corresponding anion equivalent.

7. The process as claimed in claim 1 or 2, wherein the reaction of compound (a) with inhibitor (b) is carried out in the presence of 2 to 200 parts by weight, relative to 1 part by weight of inhibitor (b), of one or more aprotic solvents which boil at 40° to 200° C. and after the reaction has ended the solvent is removed together with unconverted compound (a) which may be present.

8. The process as claimed in claim 1 or 2, wherein the reaction of the reaction product of compound (a) with inhibitor (b) with water is carried out in the presence of 10 to 1,000 parts by weight, relative to 1 part by weight of the reaction product of (a) and (b) which has been freed of excess compound (a) and, if present, aprotic solvent, of at least one solvent which boils at 30° to 120° C. and is miscible at the reaction temperature selected with at least 10% by weight of water, relative to the solvent/water mixture.

9. The process as claimed in claim 1 or 2, wherein the catalyst used for the reaction of the reaction product of compound (a) with inhibitor (b) with water is 0.001 to 0.3% by weight, relative to the reaction mixture, of at least one of the following materials: formic acid, acetic acid, propionic acid, hydrochloric acid, sulfuric acid or nitric acid.

10. The process as claimed in claim 1, wherein the reaction product of compound (a) with inhibitor (b) is applied after it has been reacted with water to those surfaces of the polymerization apparatus which can come into contact with the polymerization mixture or with the monomers alone and the coating thus produced is subjected to the treatment described in claim 1 at 40° to 200° C. for 0.25 to 5 hours.

11. The process as claimed in claim 10, wherein the coating applied to the surfaces of the polymerization apparatus is present in an amount of 0.01 to 3 g of the reaction product of compound (a) and inhibitor (b) after it has been reacted with water per $m^2$ of coated area after volatile materials have been removed from the applied mixture and after treatment at 40° to 200° C.

* * * * *